(12) United States Patent
Yang et al.

(10) Patent No.: US 8,811,148 B2
(45) Date of Patent: Aug. 19, 2014

(54) SYSTEM AND METHOD FOR SERVICE RESTORATION IN A MEDIA COMMUNICATION SYSTEM

(75) Inventors: Chen-Yui Yang, Marlboro, NJ (US); Michele Macauda, Monroe, CT (US); Paritosh Bajpay, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 970 days.

(21) Appl. No.: 12/181,970

(22) Filed: Jul. 29, 2008

(65) Prior Publication Data
US 2010/0027412 A1    Feb. 4, 2010

(51) Int. Cl.
| | |
|---|---|
| H04L 12/26 | (2006.01) |
| H04J 1/16 | (2006.01) |
| H04J 3/14 | (2006.01) |
| H04N 7/173 | (2011.01) |
| H04N 21/658 | (2011.01) |
| H04L 29/06 | (2006.01) |
| H04N 21/488 | (2011.01) |
| H04N 21/24 | (2011.01) |
| H04N 21/643 | (2011.01) |
| H04N 21/4425 | (2011.01) |
| H04N 17/00 | (2006.01) |
| H04L 12/24 | (2006.01) |
| H04M 11/06 | (2006.01) |

(52) U.S. Cl.
CPC ........ *H04L 65/1043* (2013.01); *H04N 21/6582* (2013.01); *H04L 65/4076* (2013.01); *H04N 21/4882* (2013.01); *H04N 21/2404* (2013.01); *H04N 21/64322* (2013.01); *H04N 21/4425* (2013.01); *H04N 17/004* (2013.01); *H04M 11/062* (2013.01); *H04L 41/509* (2013.01); *H04L 41/5074* (2013.01); *H04L 41/5067* (2013.01)

USPC .......... 370/216; 370/244; 370/250; 725/107; 725/129

(58) Field of Classification Search
CPC .......... H04B 17/0022; H04B 17/0025; H04B 17/0067; H04B 17/02; H04N 7/22; H04N 17/004; H04N 17/045; H04N 21/40; H04N 21/6118; H04L 12/2878; H04L 12/2602; H04L 12/2634; H04L 12/2697; H04L 43/06; H04L 43/08; H04L 43/50; H04L 41/0631; H04L 41/0654
USPC ................. 370/216–228, 241–245, 250, 252; 725/106–11, 107, 108, 129, 74
See application file for complete search history.

(56) References Cited

U.S. PATENT DOCUMENTS 6,580,727 B1 *  6/2003  Yim et al. ..................... 370/463
7,120,122 B1 * 10/2006  Starr et al. .................... 370/250
(Continued)

*Primary Examiner* — Un C Cho
*Assistant Examiner* — Jeremy Costin
(74) *Attorney, Agent, or Firm* — Guntin & Gust, PLC; Ed Guntin

(57) ABSTRACT

A system that incorporates teachings of the present disclosure may include, for example, a set-top box (STB) having a controller to generate a trouble report indicating a malfunction with one or more services, and submitting the trouble report to a mitigation system. The mitigation system can be adapted to detect one or more operational faults in at least one of a Digital Subscriber Line Access Multiplexer (DSLAM), a residential gateway (RG), and the STB, cycle operations of at least one of the DSLAM, the RG, and the STB responsive to detecting an undesirable state of operation of at least one of the DSLAM, the RG, and the STB, and generate a trouble ticket directed to a service agent responsive to detecting that at least one of the DSLAM, the RG and the STB continues to exhibit at least one operational fault. Other embodiments are disclosed.

25 Claims, 8 Drawing Sheets

(56) References Cited

U.S. PATENT DOCUMENTS

| | | | |
|---|---|---|---|
| 7,693,081 B1* | 4/2010 | Zriny et al. | 370/242 |
| 2005/0183130 A1* | 8/2005 | Sadja et al. | 725/107 |
| 2006/0233310 A1* | 10/2006 | Adams et al. | 379/2 |
| 2006/0285648 A1* | 12/2006 | Wahl et al. | 379/1.01 |
| 2007/0041554 A1* | 2/2007 | Newman et al. | 379/218.01 |
| 2007/0121792 A1* | 5/2007 | Chong | 379/1.01 |
| 2007/0153791 A1* | 7/2007 | Zheng et al. | 370/390 |
| 2007/0162932 A1* | 7/2007 | Mickle et al. | 725/37 |
| 2007/0198718 A1* | 8/2007 | Savoor et al. | 709/226 |
| 2007/0256096 A1* | 11/2007 | Wilhelm | 725/34 |
| 2007/0283400 A1 | 12/2007 | Lee et al. | |
| 2008/0040750 A1* | 2/2008 | Taylor et al. | 725/55 |
| 2008/0056254 A1 | 3/2008 | Sridhar et al. | |
| 2008/0095325 A1* | 4/2008 | Chilton et al. | 379/1.01 |
| 2008/0101448 A1* | 5/2008 | Meleis et al. | 375/225 |
| 2008/0267076 A1* | 10/2008 | Laperi et al. | 370/242 |

\* cited by examiner

200

400

SYSTEM AND METHOD FOR SERVICE RESTORATION IN A MEDIA COMMUNICATION SYSTEM

FIELD OF THE DISCLOSURE

The present disclosure relates generally to service restoration techniques and more specifically to a system and method for service restoration in a media communication system.

BACKGROUND

Operational issues can arise with media communication systems such as an Internet Protocol Television communication system, a cable TV communication system, a satellite TV communication system, and other media communication systems rich in media content and related services such as wireless or wireline telephony, and Internet data communications. Typically, subscribers of these media systems report trouble with their service by way of an interactive voice response system, and/or service personnel hired by a service provider of these systems.

DETAILED DESCRIPTION

Figure 1:
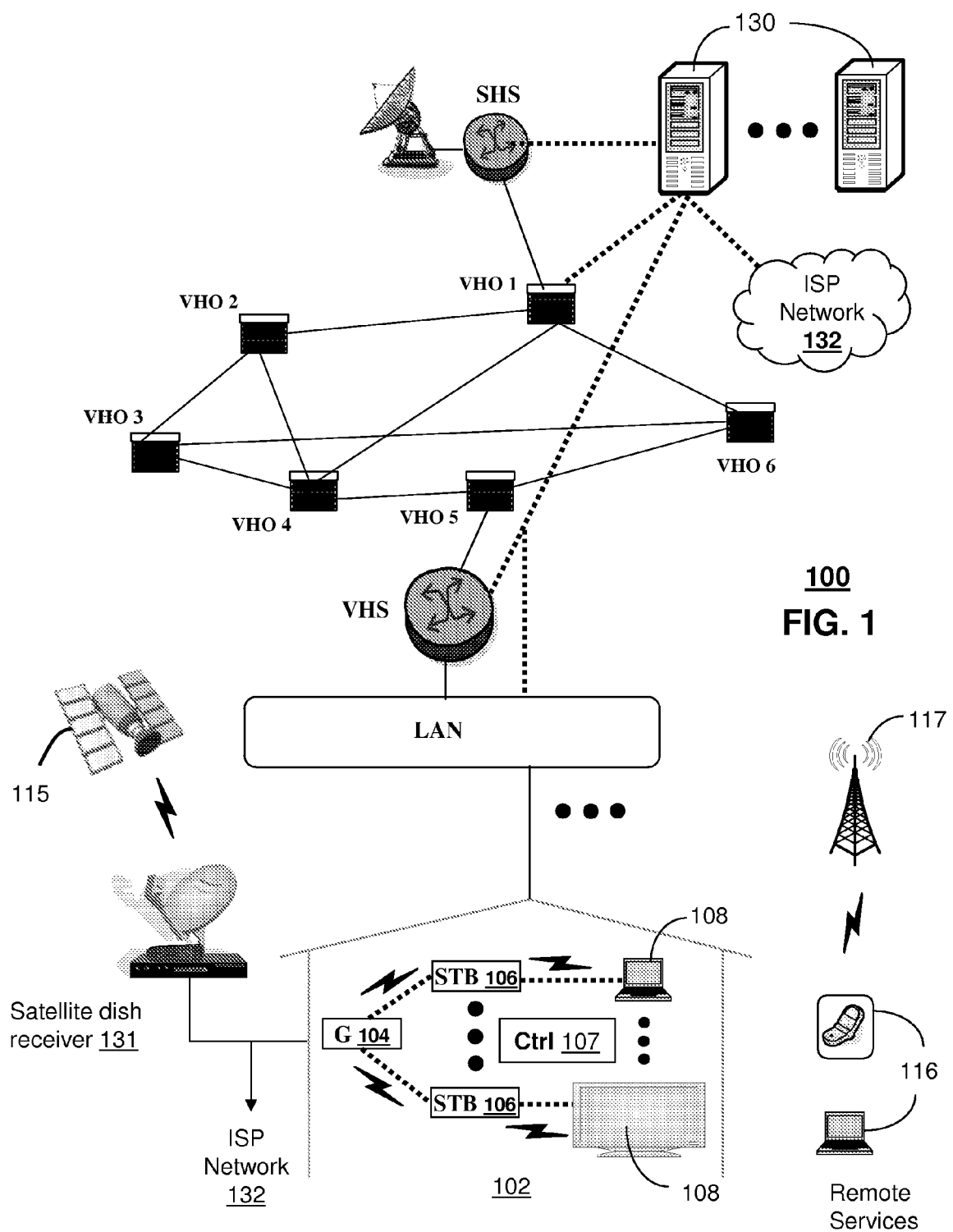
FIGS. 1-4 depict illustrative embodiments of communication systems that provide media services.

One embodiment of the present disclosure entails a method involving receiving a trouble report indicating a malfunction with one or more services supplied by an Internet Protocol (IP) media communication system to customer premise equipment (CPE) operating in the IP media communication system, identifying a subscriber account associated with the CPE, determining a state of operation of the one or more services responsive to determining from the subscriber account that said one or more services are active, detecting one or more operational faults in at least one of the CPE and a Digital Subscriber Line Access Multiplexer (DSLAM) serving the CPE, cycling operations of the DSLAM responsive to detecting an undesirable state of operation of the DSLAM, verifying that operations of the DSLAM have been restored, cycling operations of at least a portion of the CPE responsive to detecting an undesirable state of operation in at least the portion of the CPE, verifying that operations of at least the portion of the CPE have been restored, and generating a trouble ticket directed to a service agent responsive to detecting that one of the DSLAM and at least the portion of the CPE continues to exhibit at least one operational fault.

Another embodiment of the present disclosure entails a computer-readable storage medium having computer instructions for receiving a trouble report from a set-top box (STB) operating in an Internet Protocol Television (IPTV) communication system, detecting one or more operational faults in at least one of a DSLAM, a residential gateway (RG) receiving media services from the DSLAM, and the STB receiving from the RG at least a portion of said media services, cycling operations of at least one of the DSLAM, the RG, and the STB responsive to detecting an undesirable state of operation of at least one of the DSLAM, the RG, and the STB, verifying that operations of at least one of the DSLAM, the RG, and the STB have been restored, and generating a trouble ticket directed to a service agent responsive to detecting that at least one of the DSLAM, the RG and the STB continues to exhibit at least one operational fault.

Yet another embodiment of the present disclosure entails an STB having a controller to generate a trouble report indicating a malfunction with one or more services supplied by an IPTV communication system from which the STB operates, and submitting the trouble report to a mitigation system. The mitigation system can be adapted to detect one or more operational faults in at least one of a DSLAM, an RG receiving media services from the DSLAM, and the STB receiving from the RG at least a portion of said media services, cycle operations of at least one of the DSLAM, the RG, and the STB responsive to detecting an undesirable state of operation of at least one of the DSLAM, the RG, and the STB, and generate a trouble ticket directed to a service agent responsive to detecting that at least one of the DSLAM, the RG and the STB continues to exhibit at least one operational fault.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a mitigation system 130 for mitigating operational issues with one or more network element of the IPTV media system. Media service interruptions can be reported to the mitigation system 130 from customer premise equipment or CPE such as a residential gateway 104, STB 106, media presentation device 108, a computer, or telephony device. The mitigation system 130 can comprise common processing resources such as an expert rule management engine which can execute a mitigation approach defined by a service provider of the IPTV media system of FIG. 1.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
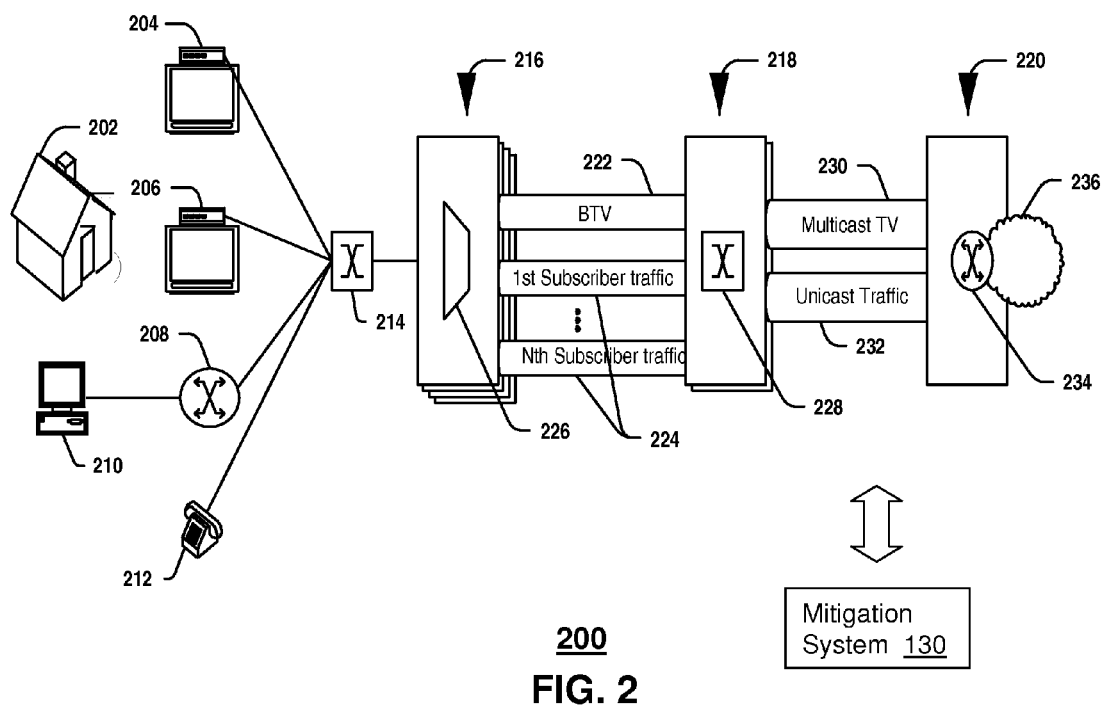

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The mitigation system 130 of FIG. 1 can be operably coupled to the second communication system 200 for purposes similar to those described above.

Figure 3:
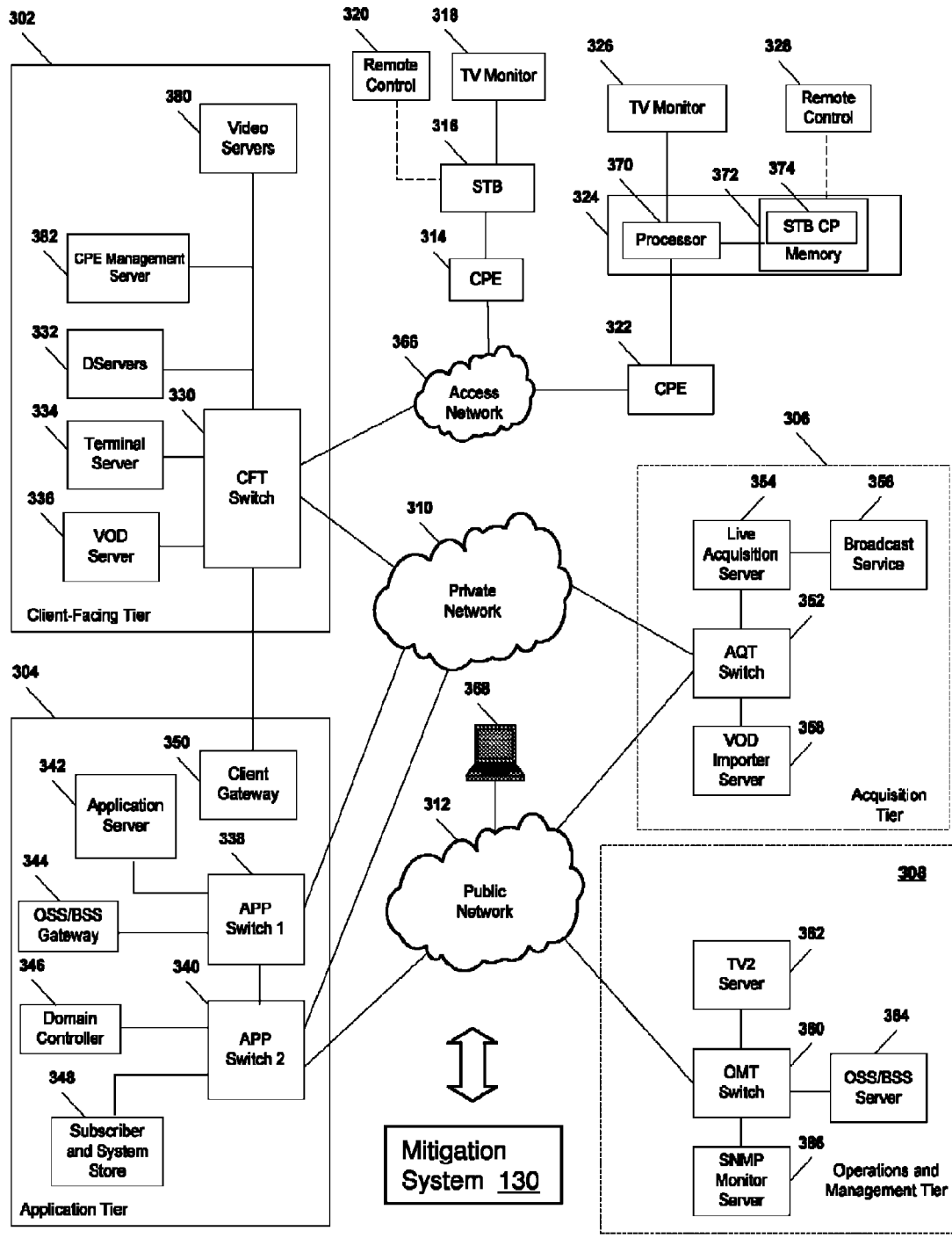

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The mitigation system 130 of FIG. 1 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
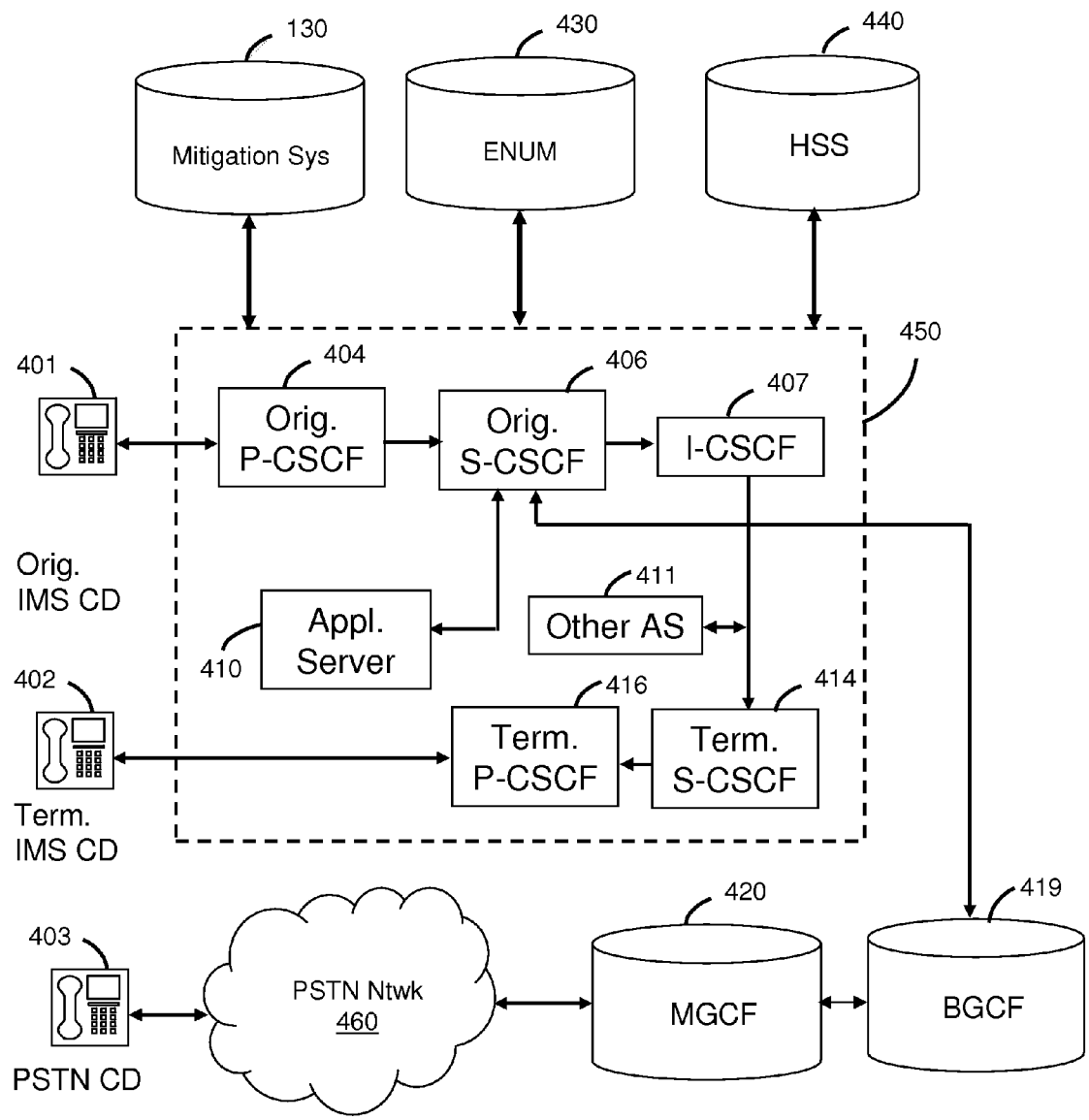

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the mitigation system 130 previously discussed for FIG. 1. In this representative embodiment, the mitigation system 130 can be accessed over a PSTN or VoIP channel of communication system 400 by common techniques such as described above.

Figure 5:
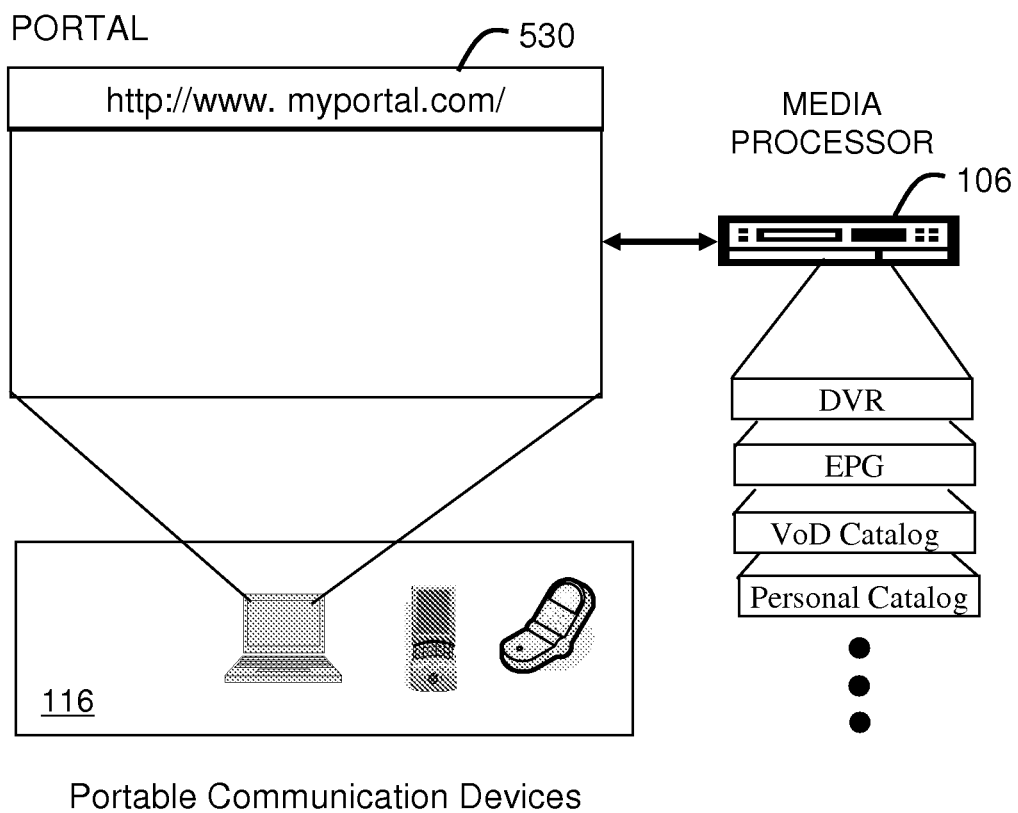
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
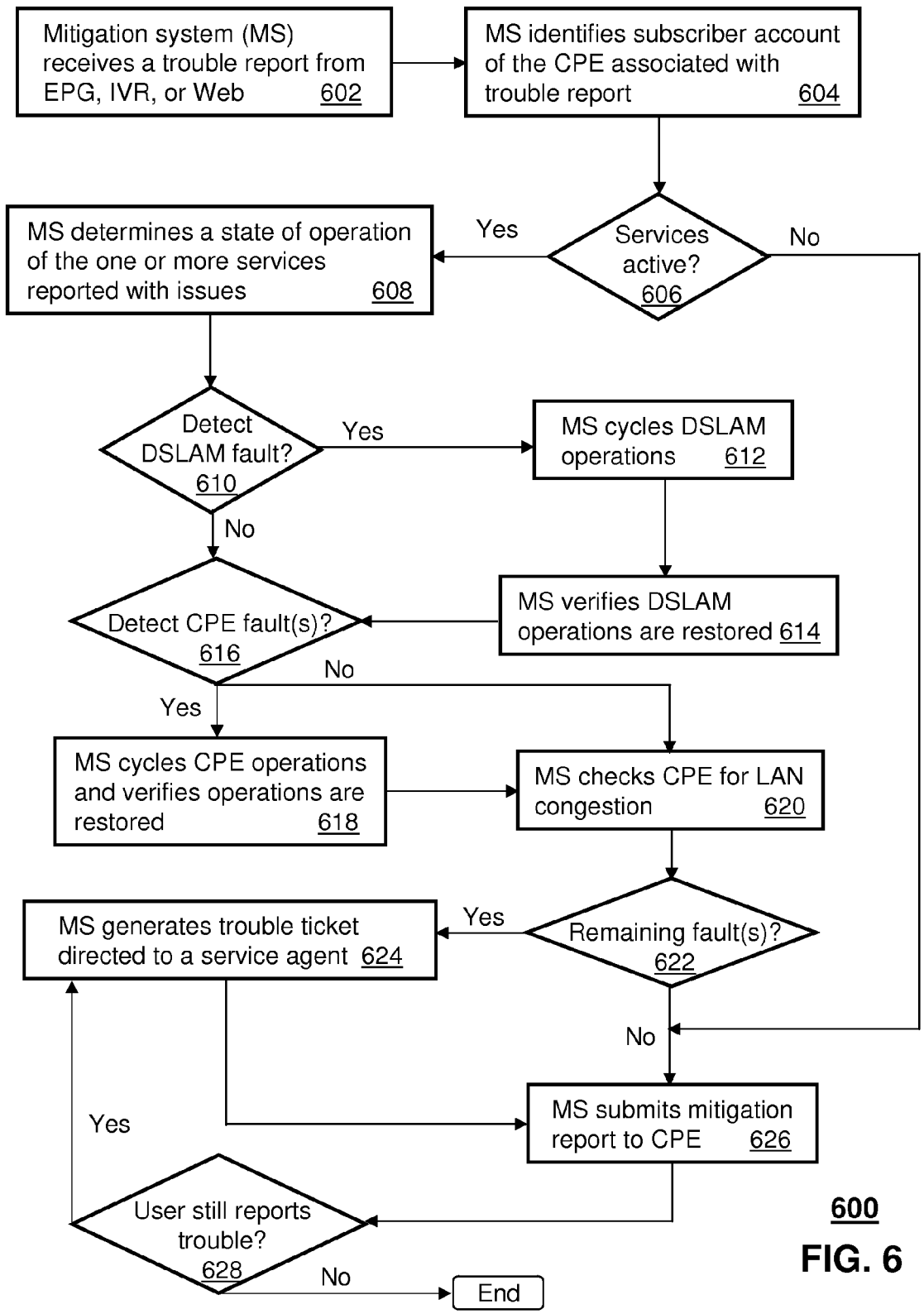
FIG. 6 depicts an illustrative method operating in portions of the communication systems of FIGS. 1-4.

FIG. 6 depicts illustrative embodiments of method 600 operating in portions of communication systems 100-400. Method 600 begins with step 602 in which the mitigation system 130 receives a trouble report from an EPG system, an IVR, or a web server. The IVR, the EPG system, and the web server can be an integral part of the mitigation system 130 or can be yet another distinct portion of the computing devices 130 of FIG. 1 communicatively coupled to the mitigation system. The IVR can utilize common voice recognition technology to navigate a subscriber through call processing menus defined by a service provider of the media communication system. When media services are interrupted, a user of an STB of FIGS. 1-3 can call an IVR by way of the STB, or by way of a PSTN or VoIP communication device of FIG. 4. The IVR can then navigate the user to identify interruptions with media services provided by any one of the media communication systems of FIGS. 1-3.

Alternatively, the user can enter a trouble report by way of an EPG presented by an STB. The user can for example identify by way of graphical user interface (GUI) of the EPG specific channels and/or media programs that are experiencing a service interruption. Upon receiving the trouble report from the STB, the EPG system can convey the trouble report to the mitigation system 130. In yet another illustrative embodiment, the user can enter a trouble report by way of the web server supplying portal services such as described in FIG. 5 to the STB or a common computer with Internet access. The web server can present the user a personalized account outlining the media services currently available to the user, and a GUI with selectable items for identifying trouble with said services. The GUI can for example represent an EPG with media programs that can be selected to identify service interruptions in a trouble report. It would be apparent to an artisan with ordinary skill in the art that there can be innumerable embodiments for presenting a user a trouble report GUI for identifying interruptions with media services. Accordingly, said embodiments are applicable to the present disclosure.

Once a trouble report is received, the mitigation system 130 can identify in step 604 a subscriber account of the CPE associated with the trouble report. As noted previously, the CPE can represent a residential gateway (or RG such as reference 104), an STB, a computer, a telephony device, or combinations thereof. In step 606, the mitigation system 130 can determine from the subscriber account whether the services identified in the trouble report are active. If the services are inactive because, for example, the service provider has deactivated the services due to a subscriber's failure to pay for these services, the mitigation system 130 proceeds to step 626 where it submits a mitigation report to the CPE. The mitigation report can notify the user that the services reported have been deactivated by the service provider with or without reasons provided.

If the mitigation system 130 on the other hand detects that the services reported are active in step 606, the mitigation system proceeds to step 608 where it determines a state of operation of the services reported to have issues. The mitigation system 130 can for example determine a state of operation of a DSLAM serving the CPE associated with the trouble report, and portions of the CPE served thereby. The mitigation can perform diagnostic testing on each of the DSLAM and portions of the CPE. Diagnostic testing can include monitoring each of these devices for operational alarms (e.g., hardware faults, software faults, power faults, etc.), and transmission issues (e.g., jitter, packet delay, packet loss rate, etc.). If the mitigation system 130 detects in step 610a fault in the DSLAM based on the aforementioned testing, the mitigation system can proceed to step 612 where it cycles operations of the DSLAM. Operational cycling of the DSLAM can represent a hardware and/or a software reset of the DSLAM.

Once the DSLAM has been operationally cycled, the mitigation system 130 proceeds to step 614 where it verifies that operations of the DSLAM have been restored. The verification step can utilize the diagnostic techniques of step 608 to make this determination. If operations have not been fully restored, the mitigation system 130 records the faults detected for later processing in steps 622-626.

Once the operations of the DSLAM have been analyzed or the mitigation system 130 detects in step 610 no faults in the DSLAM, the mitigation system proceeds to step 616 where it checks for faults in the CPE (e.g., RG, STB, media presentation device such as a TV, PSTN or VoIP telephony device). If no faults are detected, the mitigation system 130 proceeds to step 626 where it submits a mitigation report to a portion of the CPE (e.g., computer terminal, PSTN phone coupled to IVR, EPG screen presented by STB, etc.). If for example faults were not detected in either the DSLAM or the CPE served thereby, then the report will indicate no detected faults in service. In this instance, the report can ask the user if services continue to be interrupted. If the user responds in the affirmative in step 628, then the mitigation system 130 can generate a trouble ticket which is directed to a service agent (e.g., a field technician) describing the issues reported, the testing performed and associated results produced by the mitigation system, and a location of the customer associated with the CPE. The trouble ticket can be managed by a network operations center (or NOC) which coordinates with a dispatch center scheduling of a field technician to meet with the customer that generated the trouble report in step 602. The NOC can establish with the customer a visiting schedule for a field technician over an interactive communication session between the NOC and the CPE in step 626.

Referring back to step 616, if the mitigation system 130 detects a fault with the CPE, the mitigation system can proceed to step 618 where it cycles operations of the CPE in whole or in part. Cycling operations of the CPE can represent power cycling the RG, the STB, a media presentation device, a VoIP or PSTN network element, or combinations thereof. In step 618, the mitigation system 130 also verifies that operations of the CPE have been restored. In step 620 the mitigation system 130 can check whether the CPE has a LAN congestion issue independent of whether a fault was detected in step 616. A congestion issue can arise from excessive bandwidth utilization by portions of the CPE. For example, service interruption may occur if with the LAN from which the CPE operates is experiencing too much data and/or voice traffic which is causing a degradation in services.

The mitigation system 130 can probe for telemetry data (e.g., bandwidth utilization, packet loss rate, bit error rate, jitter, etc.) in the nodes of the CPE LAN (e.g., customer edge router, residential gateway, router, modem, etc.). If it finds excessive congestion, the mitigation system 130 can make note of the issues detected and potential resolutions (e.g., purchase more bandwidth from the service provider, reconfigure the CPE LAN, reduce traffic from certain CPE nodes, etc.) for later reporting in step 626.

If the mitigation system 130 detects in step 622 that operations have not been stored for the DSLAM and/or the CPE in whole or in part after the cycling steps 612 and 618, the mitigation system proceeds to step 624 where it generates a trouble ticket as described earlier which is directed to a service agent. In step 626 the NOC and the customer can coordinate a visit by a field technician. If in step 622 there are no remaining faults, but the mitigation system 130 detected LAN congestion in step 620, the mitigation system reports the LAN congestion to the CPE, and possible mitigation factors to address the congestion.

Figure 7:
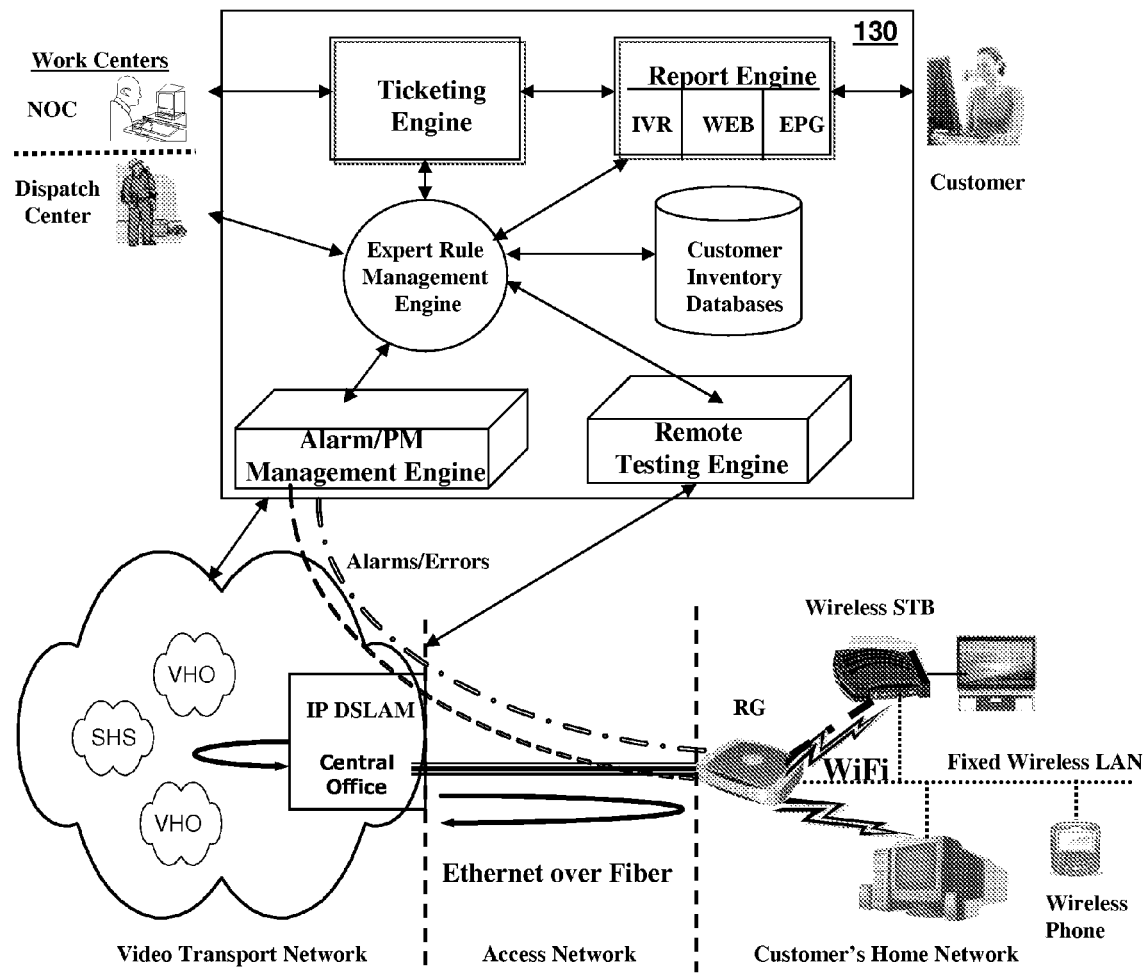
FIG. 7 depicts an illustrative embodiment of a media communication system operating according the method of FIG. 6.

FIG. 7 depicts an illustrative embodiment of the mitigation system 130 and its various sub-components for mitigating operational faults with a DSLAM and/or CPE of a customer. As illustrated in FIG. 7, the mitigation system 130 can comprise a ticketing engine, a report engine, an expert rule management engine, a customer inventory database, alarm-program management engine, and a remote testing engine. A portion of the components of the mitigation system can interact with the network elements of a media communication system such as described in FIGS. 1-3, a customer generating a trouble reports by the means described earlier, and a NOC and dispatch center in accordance with the steps of method 600.

Upon reviewing the aforementioned embodiments, it would be evident to an artisan with ordinary skill in the art that said embodiments can be modified, reduced, or enhanced without departing from the scope and spirit of the claims described below. Accordingly, the reader is directed to the claims section for a fuller understanding of the breadth and scope of the present disclosure.

Figure 8:
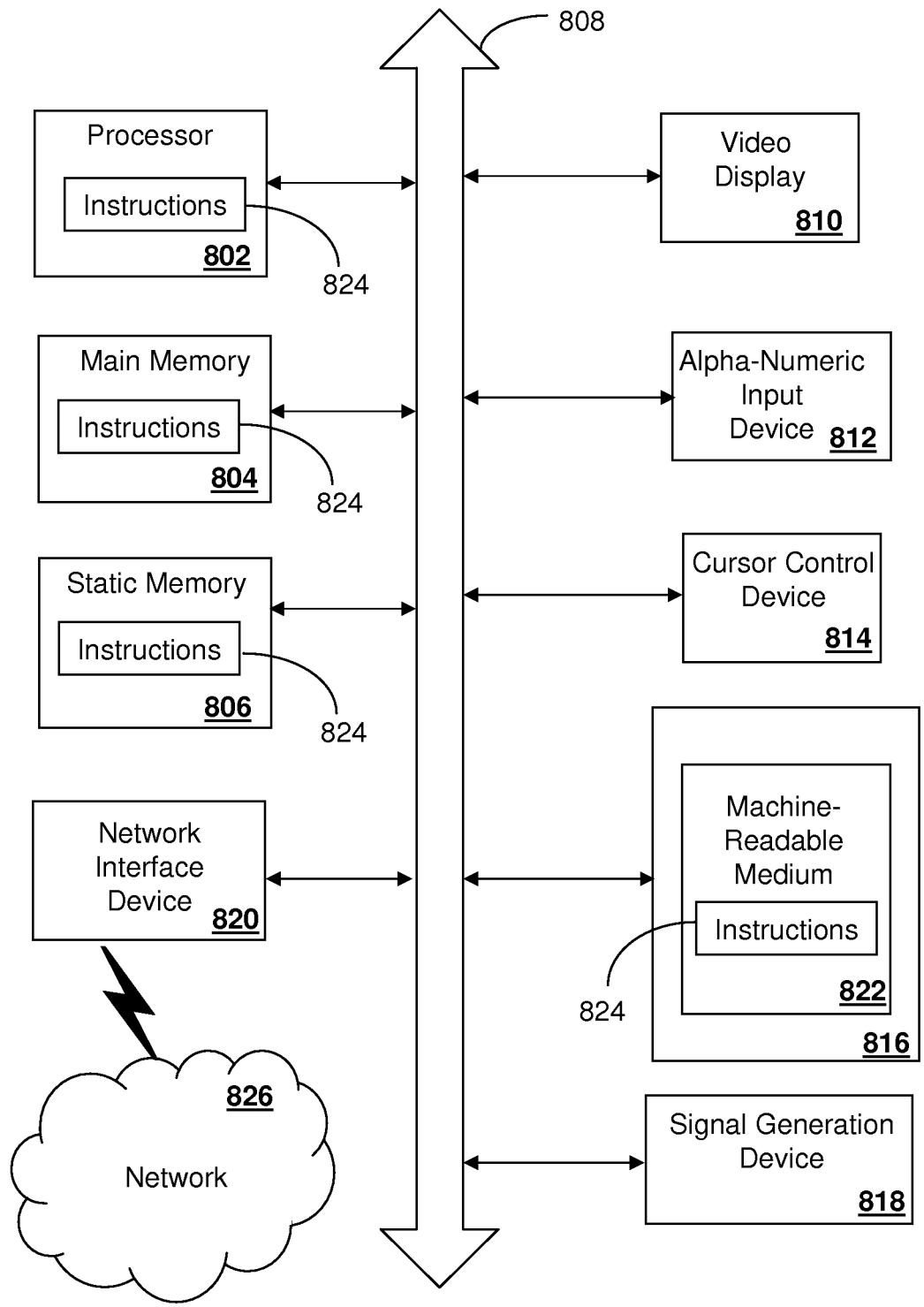
FIG. 8 is a diagrammatic representation of a machine in the form of a computer system within which a set of instructions, when executed, may cause the machine to perform any one or more of the methodologies discussed herein.

FIG. 8 depicts an illustrative diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a computer-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the computer-readable medium 822 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
receiving, by a system including a processor, a trouble report indicating a malfunction with a service supplied by a media communication system to customer premises equipment operating in the media communication system;
identifying, by the system, a subscriber account associated with the customer premises equipment;
responsive to determining from the subscriber account that the service is not inactive:
  determining, by the system, a state of operation of a digital subscriber line access multiplexer serving the customer premises equipment and the customer premises equipment;
  detecting, by the system, a first operational fault in the digital subscriber line access multiplexer serving the customer premises equipment from the state of operation of the digital subscriber line access multiplexer;
  resetting, by the system, the digital subscriber line access multiplexer responsive to detecting the first operational fault in the digital subscriber line access multiplexer;
  verifying, by the system, restoration of the digital subscriber line access multiplexer responsive to the resetting of the digital subscriber line access multiplexer;
  detecting, by the system, a second operational fault in the customer premises equipment from the state of operation of the customer premises equipment;
  power cycling, by the system, the customer premises equipment responsive to detecting the second operational fault in the customer premises equipment;
  responsive to not detecting an operation issue in the digital subscriber line access multiplexer and in the customer premises equipment:
    obtaining, by the system, telemetry data from a node of a local area network of the customer premises equipment, wherein the telemetry data comprises packet loss rate, bit error rate, jitter, or combinations thereof;
    reconfiguring, by the system, the customer premises equipment to reduce traffic in the node of the customer premises equipment responsive to detecting congestion associated with the local area network according to the telemetry data; and
  generating, by the system, a trouble ticket directed to a service agent responsive to receiving input indicating that the malfunction with the service has not been corrected, and responsive to not detecting the operation issue in the digital subscriber line access multiplexer and in the customer premises equipment and responsive to not detecting congestion in the local area network of the customer premises equipment.

2. The method of claim 1, wherein the customer premises equipment comprises a media gateway and a set-top box.

3. The method of claim 1, wherein the trouble report is received from an interactive voice response system.

4. The method of claim 1, comprising:
determining, by the system, a configuration of the local area network; and
providing, by the system, resolution information for presentation at a display device of the customer premises equipment, the resolution information including mitigation steps.

5. The method of claim 1, wherein the trouble report is received from a set-top box.

6. The method of claim 5, wherein the set-top box generates the trouble report from user inputs to an electronic programming guide that identifies a channel and a scheduled media programming experiencing the malfunction.

7. The method of claim 1, wherein the trouble report identifies the malfunction being experienced with a media program identified by an electronic programming guide managed by the customer premises equipment.

8. The method of claim 1, further comprising power cycling of, by the system, the customer premises equipment in response to detecting an undesirable state of operation of the digital subscriber line access multiplexer.

9. The method of claim 4, wherein the mitigation steps include purchase of additional bandwidth.

10. The method of claim 1, comprising submitting, by the system, a message to the customer premises equipment, the message comprising one of a first message indicating that the service reported to be malfunctioning is no longer active, a second message indicating that the service has been restored to a desired operating state, a third message indicating that the service agent has been notified, a fourth message indicating a state of mitigation of the service, or any combination thereof.

11. The method of claim 1, wherein the media communication system comprises one of an internet protocol media communication system, a broadcast media communication system, or any combination thereof.

12. A non-transitory machine-readable storage device, comprising a memory to store instructions which when executed by a processor, causes the processor to perform operations comprising:
receiving a trouble report indicating a malfunction with a service supplied by a media communication system to customer premises equipment operating in the media communication system;
identifying a subscriber account associated with the customer premises equipment;
responsive to determining from the subscriber account that the service is not inactive:
  determining a state of operation of a digital subscriber line access multiplexer serving the customer premises equipment and the customer premises equipment;
  detecting a first operational fault in the digital subscriber line access multiplexer serving the customer premises equipment from the state of operation of the digital subscriber line access multiplexer;
  resetting the digital subscriber line access multiplexer responsive to detecting the first operational fault in the digital subscriber line access multiplexer;
  verifying restoration of the digital subscriber line access multiplexer responsive to the resetting of the digital subscriber line access multiplexer;
  detecting a second operational fault in the customer premises equipment from the state of operation of the customer premises equipment;
  power cycling the customer premises equipment responsive to detecting the second operational fault in the customer premises equipment;
  responsive to not detecting an operation issue in the digital subscriber line access multiplexer and in the customer premises equipment:
    obtaining telemetry data from a node of a local area network of the customer premises equipment, wherein the telemetry data comprises packet loss rate, bit error rate, jitter, or combinations thereof;
    reconfiguring the customer premises equipment to reduce traffic in the node of the customer premises equipment responsive to detecting congestion associated with the local area network according to the telemetry data; and generating a trouble ticket directed to a service agent responsive to receiving input indicating that the malfunction with the service has not been corrected, and responsive to not detecting the operation issue in the digital subscriber line access multiplexer and in the customer premises equipment and responsive to not detecting congestion in the local area network of the customer premises equipment.

13. The non-transitory machine-readable storage device of claim 12, wherein the customer premises equipment comprises a media gateway and a set-top box.

14. The non-transitory machine-readable storage device of claim 12, wherein the trouble report is received from an interactive voice response system.

15. The non-transitory machine-readable storage device of claim 12, comprising:
determining a configuration of the local area network; and
providing resolution information for presentation at a display device of the customer premises equipment, the resolution information including mitigation steps.

16. The non-transitory machine-readable storage device of claim 12, wherein the trouble report is received from a set-top box.

17. The non-transitory machine-readable storage device of claim 16, wherein the set-top box generates the trouble report from user inputs to an electronic programming guide that identifies a channel and a scheduled media programming experiencing the malfunction.

18. The non-transitory machine-readable storage device of claim 12, wherein the trouble report identifies the malfunction being experienced with a media program identified by an electronic programming guide managed by the customer premises equipment.

19. A server, comprising:
a memory to store instructions; and
a processor coupled to a memory, wherein the processor, responsive to executing the instructions performs operations comprising:
receiving a trouble report indicating a malfunction with a service supplied by a media communication system to customer premises equipment operating in the media communication system;
identifying a subscriber account associated with the customer premises equipment;
responsive to determining from the subscriber account that the service is not inactive:
determining a state of operation of a digital subscriber line access multiplexer serving the customer premises equipment and the customer premises equipment;
detecting a first operational fault in the digital subscriber line access multiplexer serving the customer premises equipment from the state of operation of the digital subscriber line access multiplexer;
resetting the digital subscriber line access multiplexer responsive to detecting the first operational fault in the digital subscriber line access multiplexer;
verifying restoration of the digital subscriber line access multiplexer responsive to the resetting of the digital subscriber line access multiplexer;
detecting a second operational fault in the customer premises equipment from the state of operation of the customer premises equipment;
power cycling the customer premises equipment responsive to detecting the second operational fault in the customer premises equipment;
responsive to not detecting an operation issue in the digital subscriber line access multiplexer and in the customer premises equipment:
obtaining telemetry data from a node of a local area network of the customer premises equipment, wherein the telemetry data comprises packet loss rate, bit error rate, jitter, or combinations thereof;
reconfiguring the customer premises equipment to reduce traffic in the node of the customer premises equipment responsive to detecting congestion associated with the local area network according to the telemetry data; and
generating a trouble ticket directed to a service agent responsive to receiving input indicating that the malfunction with the service has not been corrected, and responsive to not detecting the operation issue in the digital subscriber line access multiplexer and in the customer premises equipment and responsive to not detecting congestion in the local area network of the customer premises equipment.

20. The server of claim 19, wherein the customer premises equipment comprises a media gateway and a set-top box.

21. The server of claim 19, wherein the trouble report is received from an interactive voice response system.

22. The server of claim 19, comprising:
determining a configuration of the local area network; and
providing resolution information for presentation at a display device of the customer premises equipment, the resolution information including mitigation steps.

23. The server of claim 19, wherein the trouble report is received from a set-top box.

24. The server of claim 23, wherein the set-top box generates the trouble report from user inputs to an electronic programming guide that identifies a channel and a scheduled media programming experiencing the malfunction.

25. The server of claim 19, wherein the trouble report identifies the malfunction being experienced with a media program identified by an electronic programming guide managed by the customer premises equipment.

* * * * *